UNITED STATES PATENT OFFICE.

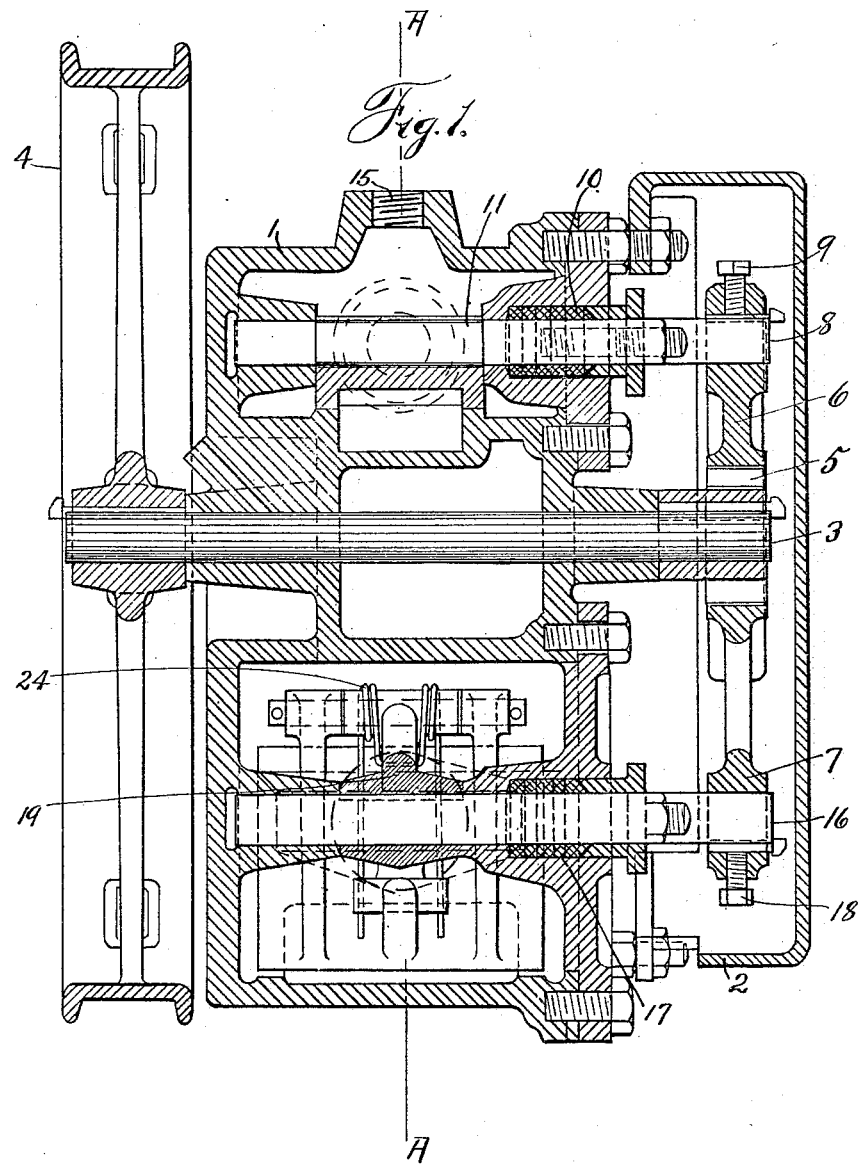

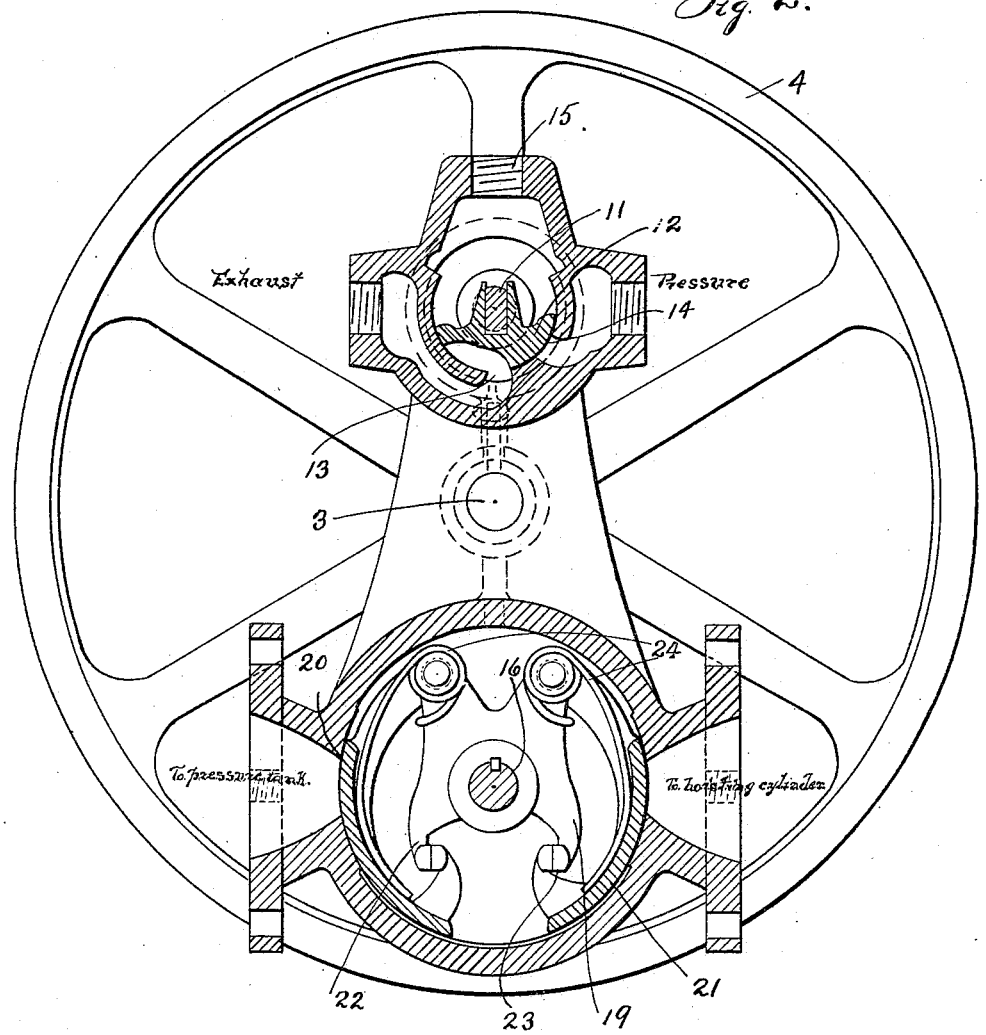

DAVID L. LINDQUIST, OF HARTSDALE, NEW YORK, AND WILLIAM H. HULTGREN, OF ROSELLE PARK, NEW JERSEY, ASSIGNORS TO OTIS ELEVATOR COMPANY, OF JERSEY CITY, NEW JERSEY, A CORPORATION OF NEW JERSEY.

HYDRO-STEAM VALVE.

1,298,067. Specification of Letters Patent. Patented Mar. 25, 1919.

Application filed June 12, 1917. Serial No. 174,180.

*To all whom it may concern:*

Be it known that we, DAVID L. LINDQUIST, a subject of the King of Sweden, residing in Hartsdale, in the county of Westchester and State of New York, and WILLIAM H. HULTGREN, a citizen of the United States, residing in Roselle Park, Essex county, and State of New Jersey, have invented a new and useful Improvement in Hydro-Steam Valves, of which the following is a specification.

Our invention relates to an improvement in valve mechanism and involves a steam valve and a water valve connected together to be operated in unison. It is to be understood, of course, that any fluid under pressure may be used such as steam or air, and the steam or air may actuate water, oil, or any other fluid desired. The valves are of the rotary type and are controlled by a shipper sheave which, when rotated, will operate both valves simultaneously.

In the accompanying drawings, Figure 1, is a sectional elevation view; and Fig. 2 is a section taken on the line A A of Fig. 1.

Referring to the drawings in detail, 1 designates a casing within which our valve mechanism is confined, this casing being provided with a cover plate 2. Extending through the center of this casing is a shaft 3, which carries in this instance a shipper sheave 4 used to operate the valves, although it is to be understood that any suitable means may be attached to the shaft 3, in place of the shipper sheave 4, for operating the valves. Keyed to the shaft 3 is a pinion 5, this pinion engaging gear sectors 6 and 7 controlling the operation of the steam valve and the water valve respectively. The sector 6 is carried on the shaft 8 and is keyed thereto and held in place by a set screw 9. The shaft 8 extends through a stuffing box 10 and into the casing 1. Formed on the shaft 8 is a flattened portion 11 engaging the gate 12 of the steam valve. This gate 12 is adapted to control ports 13 and 14 leading to exhaust and pressure passages respectively. Steam or air pressure supply may be used and is admitted to the valve by pressure supply pipe 15.

The gear sector 7 is keyed to a shaft 16 extending through a stuffing box 17 into the casing 1, and is held in place on said shaft by a set screw 18. The shaft 16 has keyed thereto a spider 19. Pivotally secured to the spider 19 are gates 20 and 21 controlling the flow of fluid to and from a pressure tank and a hoisting cylinder respectively (not shown). The spider 19 likewise has extensions 22 and 23 adapted to engage the lugs 22', 23' on the free ends of the gates 20 and 21 so that in conjunction with the pivotal connections to the spider 19 excessive valve seat pressure upon the gate serving at the time of rotation to open or close the pressure port is practically eliminated by the lifting action of the mechanism. This construction independent of direction of rotation of the shaft 16 prevents abrasion of the valve seat surfaces. Self adjustment as may be necessary by reason by wear or mechanical imperfections in the process of manufacture is also secured, so that trouble and annoyances due to leaky valves is obviated, and as friction incidental to motion and valve seat pressure upon the gates is reduced to minimum, ease of operating the mechanism as a unit is facilitated. A one-piece spring 24 is so shaped as to comprise a central loop, two coil, and two stems. Such a spring is fitted on the spider 19 at each of the pivotal connections with the gates 20 and 21. The central loop of the spring engages the spider, and the stems are brought to bear against the gate, thus exerting a continuous outward pressure on the gate. In the absence of other pressure, these springs will hold the gates 20 and 21 closed against their seats, which is a desirable feature in the operation of this type of valve, under all conditions of operation.

The operation of the mechanism described is as follows:

In the position shown in the drawings, the gate 12 of the steam valve is closing off port 14 to the pressure tank with the exhaust port 13 open. The water valve gates 20 and 21 are in central position with the ports controlled thereby closed off. If now the shaft 3 be rotated in an anti-clockwise direction by means of the shipper sheave 4, the shaft 8 connected thereto by means of the pinion 5 and gear sector 6 will be rotated in a clock-wise direction carrying with it the gate 12 of the steam valve to cause the same to open the port 14 to the pressure tank and close off port 13 to the exhaust by which communication between the pipe 15 and port 14 is also established, allowing steam or air under pressure to flow from the source of pressure supply to the pressure tank.

As the shaft 3 is rotated in an anti-clockwise direction, the shaft 16 connected with the water valve will be rotated in a clockwise direction to cause the gate 21 to uncover its port leading to the hoisting cylinder, and the water in the pressure tank will lift the gate 20 off its seat, swinging the gate about the pivot by which it is connected to the spider 19; and water may now flow from the pressure tank through the water valve to the hoisting cylinder under the action of the pressure flowing through the steam or air valve. At the time the water valve is actuated, as just described, the projection 23 on the spider 19, engaging the projection 23' on the end of the gate, will have a lifting action as the valve is being rotated to eliminate the friction between the gate and its seat. The operation of the valve mechanism in the opposite direction is accomplished by merely rotating the shaft 3 in a clockwise direction to cause the gate 12 of the steam or air valve to establish communication between the pressure port 14 and the exhaust port 13, this movement of the shaft 3 at the same time imparting motion to the water valve to cause the gate 20 to uncover its port, and the water from the hoisting cylinder may now flow back into the pressure tank lifting the gate 21 of the water valve by swinging it on its pivot, by which it is connected to the spider 19. This movement of the water valve will cause the projection 22 on the spider 19, which engages the projection 22' on the gate 20, to give a lifting action to eliminate friction between the gate and its seat in the same way as already described in connection with the gate 21. With the valves in central position it will be seen that there can be no leakage from the pressure tank to the hoisting cylinder or vice versa, inasmuch as any fluid which may tend to flow from the pressure tank through the water valve to the hoisting cylinder is blocked by the gate 21 leading to the hoisting cylinder, and likewise any fluid which may tend to flow from the hoisting cylinder back to the pressure tank, due to leakage of pressure from the pressure tank, will be blocked by the gate 20. This feature is of great importance where the valve mechanism is used in connection with hoisting apparatus, such as an elevator for instance where it is desired to hold the load stationary, as without the provision of this feature of our valves, any accidental lowering of pressure in the pressure tank, due to leakage for instance, would permit the load to descend by gravity, which of course might render the whole apparatus impracticable. In admitting fluid to the hoisting cylinder from the pressure tank, it will be seen that inasmuch as the gate 20, as it is moved on its seat, does not open its port except by pressure of the water in the pressure tank, should the pressure in the pressure tank at the instant of opening the valve to force fluid from the pressure tank to the hoisting cylinder be so low as to be insufficient to raise the load, the load cannot force the fluid in the opposite direction to allow the load to descend, for the reason that the valve 20 will be held on its seat to close off its port by the excess pressure on the hoisting cylinder side of the seat. Likewise with the load at rest there can be no flow of fluid from the pressure tank to the hoisting cylinder should the load be lessened, as for an instance, in the case of an elevator car, should the car be at a landing heavily loaded the people getting off the car will not cause the elevator to be moved upwardly without actuating the valve by means of the shaft 3, for the reason that while the pressure in the pressure tank at that instant is in excess of that required to hold the load at rest, it will nevertheless be unable to force fluid from the pressure tank to the hoisting cylinder by reason of the fact that the gate 21 is in position to close off its port and will be held seated by the excess pressure on the pressure tank side.

We have not shown this valve mechanism connected to hoisting mechanism of any kind for the reason that it may be applied to any kind of hoisting mechanism desired, our invention residing merely in a novel construction of the valves themselves and their connection with each other.

We desire not to be limited to the precise details of construction and arrangement of parts as herein shown for the reason that others skilled in the art might make various changes therein without departure from the spirit and scope of our invention.

What we claim and desire to secure by Letters Patent of the United States is:

1. In valve mechanism, the combination of two valves, a single controlling means therefor, a shaft for supporting one of said valves, said valve comprising two gates pivotally connected to said shaft, means to effect an engagement between the free ends of the gates and the shaft to lift the gates in their seats against valve seat pressure.

2. In valve mechanism, the combination of a rotary valve, pressure and exhaust ports controlled thereby, a rotatable shaft, a spider fast onto the shaft, a second rotary valve comprising two gates pivoted to the spider, lugs on the free ends of the gates, engageable by the lugs of the spider, a spring to exert pressure on the gates against the valve face, ports controlled by the gates, means for operating said valves simultaneously to open the pressure port of the first named valve, and both ports of the second named valve.

3. In valve mechanism, the combination of a valve, controlling means therefor, a second valve also controlled by said controlling means, two gates for said last named valve, and means for lifting one gate off its seat due to the rotation of the two valves by the said controlling device.

4. In valve mechanism, the combination of a valve, controlling means therefor, another valve controlled by said controlling means, two gates forming a part of said last named valve, ports controlled thereby, and means forming a part of said last named valve whereby one gate due to the rotation of the valve will uncover its port while the other gate for the same reason will simultaneously be lifted off its seat.

5. In a valve mechanism of the class described, the combination of valves for simultaneous manipulation as a single unit, one valve adapted to the control of steam or air under pressure, a second valve adapted to the control of direction of flow of a noncompressible liquid under more or less pressure, as predetermined by the valve member controlling the source of pressure supply, the second valve having members pivoted to a rotatable spider, provided with clearances at the pivoted connections to secure self adjustment of the gates relative to the valve seats, extensions or lugs at the free end of each gate to engage with projecting arms of the spider to provide a lifting action by which the gates are relieved of valve seat pressure upon rotation of the spider independent of the direction of such rotation.

In testimony whereof, I have signed my name to this specification in the presence of two subscribing witnesses.

DAVID L. LINDQUIST.

Witnesses:
FRED W. MIDGLEY,
A. A. HELLBORN.

In testimony whereof I have signed my name to this specification in the presence of two subscribing witnesses.

WILLIAM H. HULTGREN.

Witnesses:
ERNEST L. GALE, Jr.,
HAZEL R. GATES.

Copies of this patent may be obtained for five cents each, by addressing the "Commissioner of Patents, Washington, D. C."